United States Patent
Cannon et al.

(10) Patent No.: US 8,760,091 B2
(45) Date of Patent: Jun. 24, 2014

(54) MULTIFUNCTION PMDC MOTOR APPARATUS AND METHOD THEREOF

(75) Inventors: Jeff Cannon, Palatine, IL (US); Athanase N Tsergas, Wood Dale, IL (US); Edward V Minnich, Grayslake, IL (US); Stoyan Staev, Lombard, IL (US)

(73) Assignee: Merkle-Korff Industries, Inc., Elk Grove Village, IL (US)

( * ) Notice: Subject to any disclaimer, the term of this patent is extended or adjusted under 35 U.S.C. 154(b) by 72 days.

(21) Appl. No.: 13/051,285

(22) Filed: Mar. 18, 2011

(65) Prior Publication Data

US 2012/0234856 A1  Sep. 20, 2012

(51) Int. Cl.
*H02P 7/00*   (2006.01)
*H02K 7/116*   (2006.01)

(52) U.S. Cl.
CPC . *H02P 7/00* (2013.01); *H02K 7/116* (2013.01)
USPC ............... 318/280; 222/333; 62/59; 310/68 R

(58) Field of Classification Search
USPC ................... 310/83, 68 R; 222/1, 333; 62/59; 318/280
See application file for complete search history.

(56) References Cited

U.S. PATENT DOCUMENTS

| | | | | |
|---|---|---|---|---|
| 2,857,777 | A * | 10/1958 | Porter | 74/432 |
| 6,054,785 | A * | 4/2000 | Kerdjoudj et al. | 310/40 MM |
| 6,573,670 | B2 * | 6/2003 | Machalek et al. | 318/15 |
| 6,617,726 | B1 * | 9/2003 | Tsergas | 310/75 R |
| 6,998,744 | B2 * | 2/2006 | Tsergas | 310/83 |
| 7,426,838 | B1 * | 9/2008 | Shapiro et al. | 62/353 |
| 7,714,525 | B2 * | 5/2010 | Hittie et al. | 318/280 |
| D649,983 | S * | 12/2011 | Hancock et al. | D15/89 |
| 8,201,478 | B2 * | 6/2012 | Ramirez et al. | 74/606 R |
| 2004/0099076 | A1 * | 5/2004 | Haskin et al. | 74/425 |
| 2007/0199407 | A1 * | 8/2007 | Ramirez et al. | 74/665 L |
| 2008/0079335 | A1 * | 4/2008 | Ashe et al. | 310/68 R |
| 2008/0174256 | A1 * | 7/2008 | Hittie et al. | 318/280 |
| 2011/0232318 | A1 * | 9/2011 | Ramirez et al. | 62/320 |
| 2011/0265594 | A1 * | 11/2011 | Ramirez et al. | 74/416 |

* cited by examiner

*Primary Examiner* — Kevin P Shaver
*Assistant Examiner* — Michael J Melaragno
(74) *Attorney, Agent, or Firm* — Maginot, Moore & Beck, LLP

(57) ABSTRACT

A control circuit for a PMDC motor used in an ice delivery apparatus, the circuit including a double pole double throw relay that switches both sides of the circuit and peripheral circuitry connected between a power source and the double pole double throw relay to rectify the power source and power the PMDC motor.

5 Claims, 10 Drawing Sheets

MULTIFUNCTION PMDC MOTOR APPARATUS AND METHOD THEREOF

FIELD OF THE INVENTION

The present general inventive concept relates to a multifunctional PMDC motor, and more particularly to a PMDC motor for an ice delivery system to provide multiple types of ice, e.g., crushed, shaved, and cubed.

BACKGROUND OF THE INVENTION

Related art provides an IDI (in door ice) gear motor device having a single output shaft and limited to two basic functions, i.e., crushed ice dispensing and cube dispensing.

The IDI motor achieves these functions by rotating the motor clockwise for one function counter-clockwise for the other function. Thus, the IDI gear motor is incapable of providing any other forms of ice.

Devices that provide a third or more function to dispense a third or more form of ice, such as shaved ice, are required to have two motors and two output shafts each connected to one of the two motors.

One of the motors performs the crushing & cubing functions as described above and the second of the motors having a separate gear train performs the shaved ice function. Thus, devices that provide a third or more function to dispense a third or more form of ice require additional parts that increase area/size and weight and are largely duplicative.

Therefore, it is desirable to provide a motor for ice delivery that provides a third or more function to dispense a third or more form of ice, i.e., crushed, cubed, and shaved, and that operates with a single motor having that consumes a small area/size, weighs less, requires fewer parts, operates with increased efficiency, can be manufactured more economically, can fit within an existing predetermined space in the refrigerator/freezer, and does not sacrifice performance.

SUMMARY OF THE INVENTION

A principal object of the present general inventive concept is to provide an ice dispenser that operates with increased efficiency and is energy efficient.

Another object of the present general inventive concept is to provide an ice dispenser that can be manufactured more economically with a cost-reduced motor.

Another object of the present general inventive concept is to provide an ice dispenser that provides the aforementioned objects without sacrificing performance.

Another object of the present general inventive concept is to provide an ice dispenser that is easy to assemble and install.

Another object of the present general inventive concept is to provide an ice dispenser that processes ice in various forms including cubed, crushed, and/or shaved.

Another object of the present general inventive concept is to provide an efficient method of delivering different forms of ice while conserving water, using water more effectively, and consuming minimal operator time during the dispensing process.

The foregoing and other objects are intended to be illustrative of the present general inventive concept and are not meant in a limiting sense. Many possible embodiments of the present general inventive concept may be made and will be readily evident upon a study of the following specification and accompanying drawings comprising a part thereof. Various features and subcombinations of present general inventive concept may be employed without reference to other features and subcombinations. Other objects and advantages of this present general inventive concept will become apparent from the following description taken in connection with the accompanying drawings, wherein is set forth by way of illustration and example, an embodiment of this present general inventive concept and various features thereof.

BRIEF DESCRIPTION OF THE DRAWINGS

A preferred embodiment of the present general inventive concept, illustrative of the best mode in which the applicant has contemplated applying the principles, is set forth in the following description and is shown in the drawings.

DETAILED DESCRIPTION OF THE PREFERRED EMBODIMENTS

As required, a detailed embodiment of the present invention is disclosed herein; however, it is to be understood that the disclosed embodiment is merely exemplary of the principles of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Figure 1:
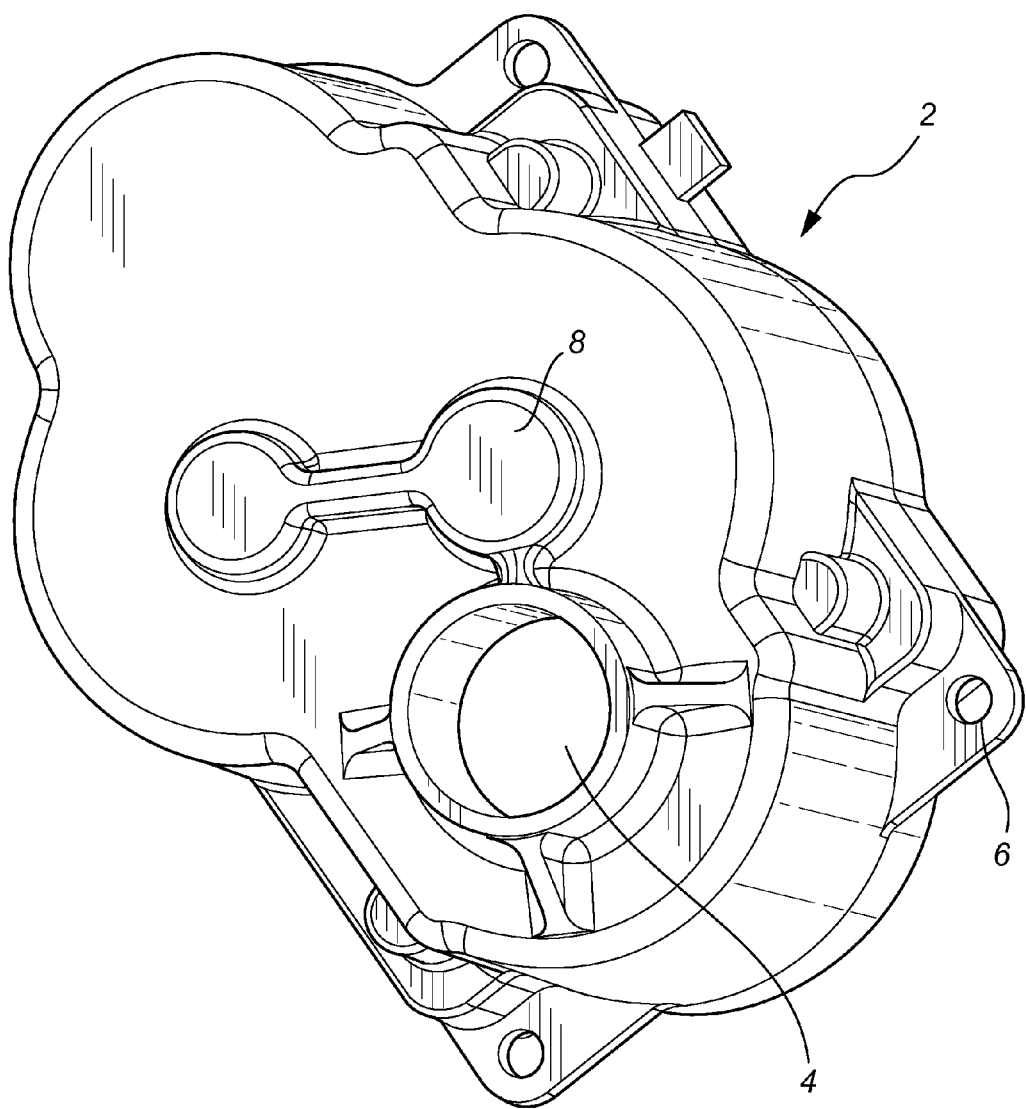
FIG. 1 is a top view of the present general inventive concept illustrating the shape of the main gear box and areas of importance.
Figure 2:
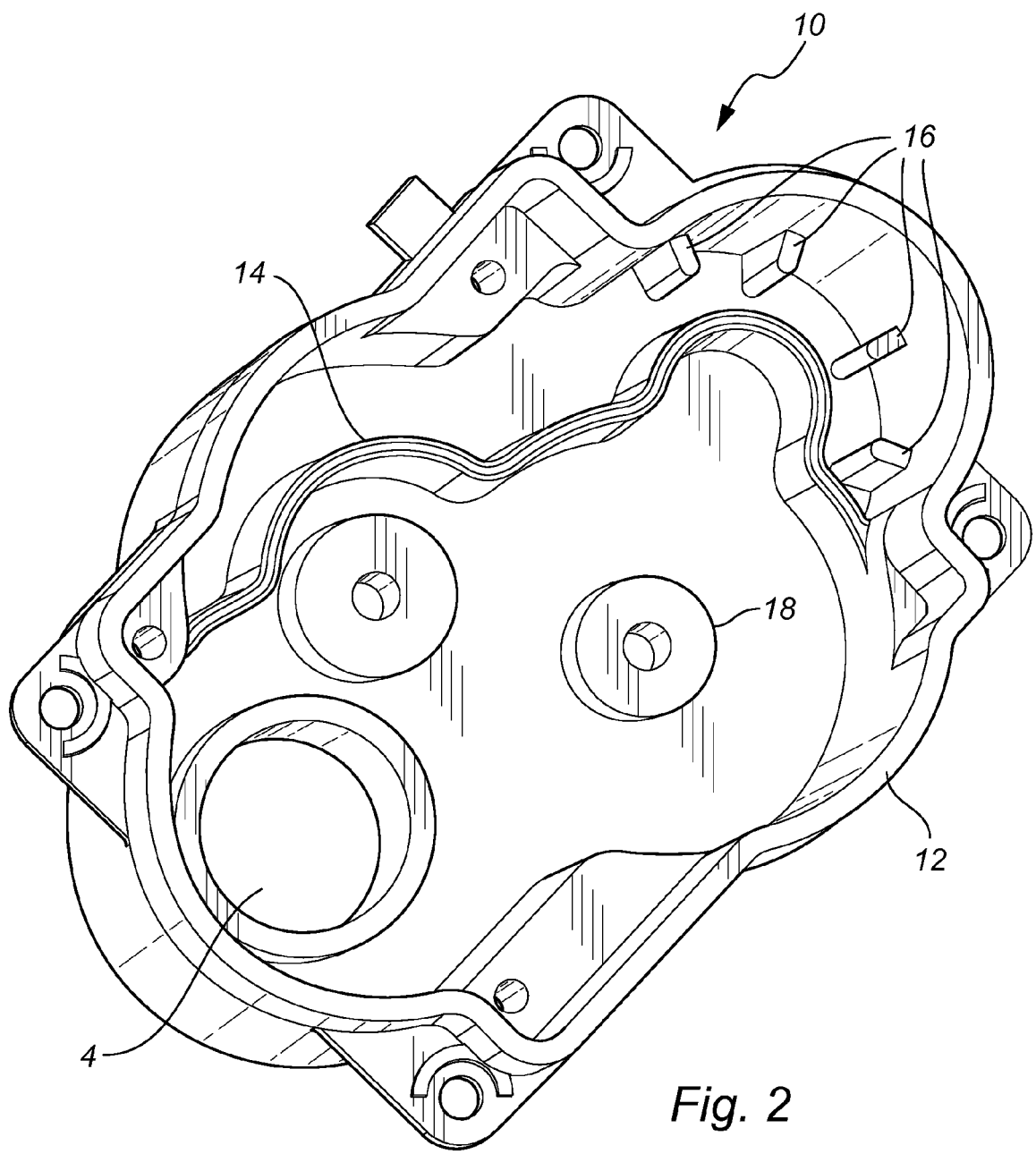
FIG. 2 is an interior view of is a top view of the present general inventive concept illustrating the shape of the main gear box and areas of importance.

The main gear box (2) has a general shape and dimensions that are sufficient to house a gear motor assembly. The general exterior shape of the main gear box (2) including an output shaft opening (4) are shown in FIG. 1. This view also shows the mounting holes (6) and the external view of the gear pin pockets (8). The general interior shape (10) of the main gear box (2) including the output shaft opening (4) is shown in FIG. 2. This view shows an exterior wall (12) and an interior wall (14). The interior wall (14) can be provided so as to create two distinct sections within the main gear box, it provides additional strength, acoustics and keeps the gears separated from other components within the main gear box. The main gear box is typically positioned within a freezer compartment or within an outer door of the freezer or refrigerator. The motor (22) is controlled by a circuit which is discussed in detail below. The gear motor assembly includes a PMDC motor (22) and an output shaft which can be rotated freely in both a clockwise and counter clockwise direction by the motor (22). The output shaft is attached to one or more implements to dispense, crush and/or shave ice, based for example on a user selection or an automatic selection.

Figure 3:
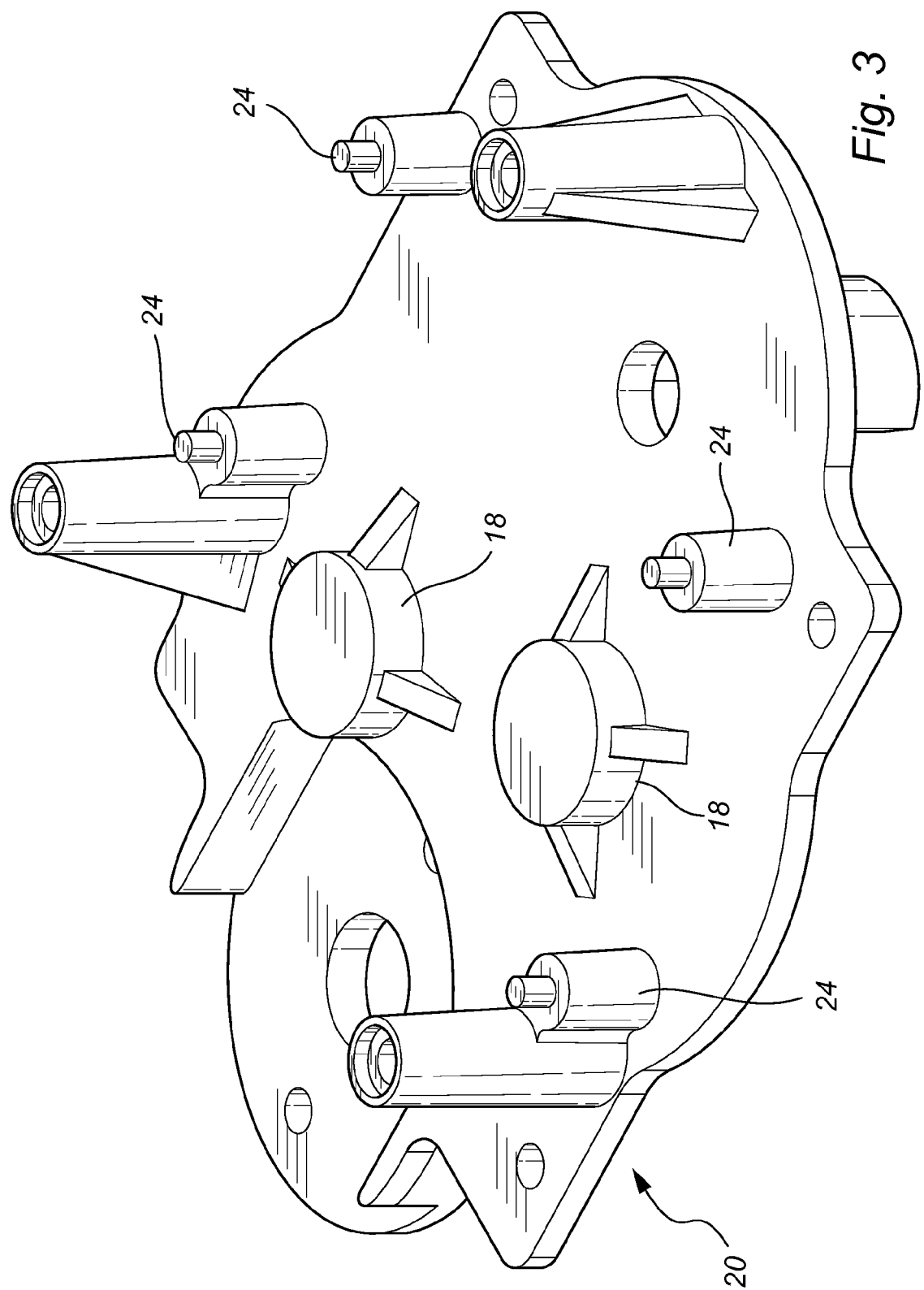
FIG. 3 is a top view of the present general inventive concept illustrating the shape of the center plate and areas of importance.

The motor (22) is mounted on a center plate (20) shown in FIG. 3. The center plate (20) has a general shape and dimensions sufficient to support a motor. The top view of the gear pin pockets (18) are also shown in FIG. 3. Printed Circuit Board (PCB) mounting bosses (24) are located on the center plate. The PCB is attached to the center plate (20) via the mounting bosses (24). The PCB mounting bosses are not limited to 4 mounting bosses as shown in this embodiment, as more than 4, or less than 4 mounting bosses can be provided on the center plate (20) to secure the motor.

Figure 4:
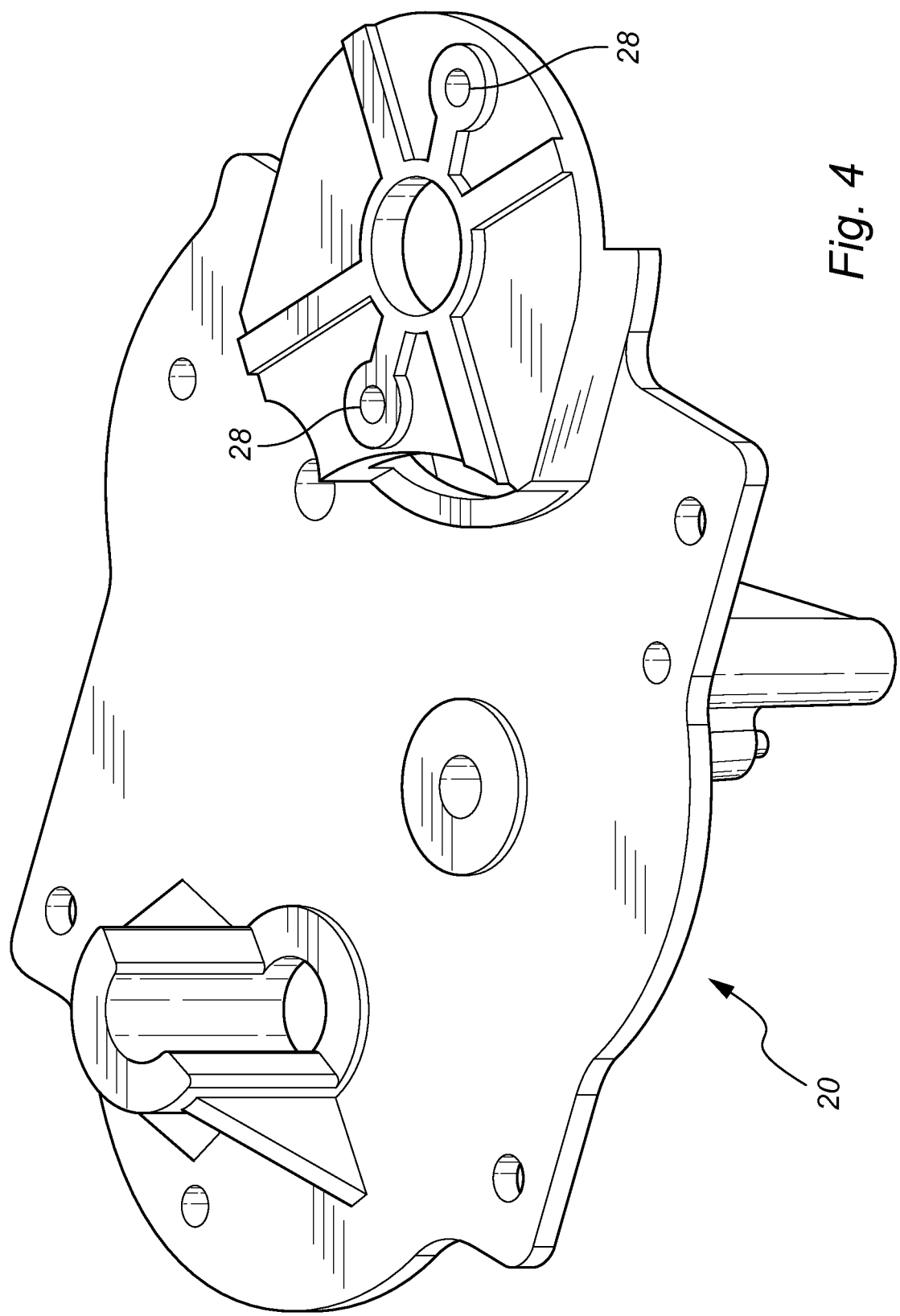
FIG. 4 is a bottom view of the present general inventive concept illustrating the shape of the center plate and areas of importance.

A bottom view of the center plate (20) is shown in FIG. 4. Two PMDC mounting holes (28) are located on the center plate. Securing means, for example a screw or the like, can be inserted through the mounting holes and corresponding openings on the motor to secure the motor on the center plate (20). The mounting holes are not limited to two mounting holes as shown in this embodiment, as more than two mounting holes can be provided on the center plate (20) to secure the motor to the center plate.

Figure 5:
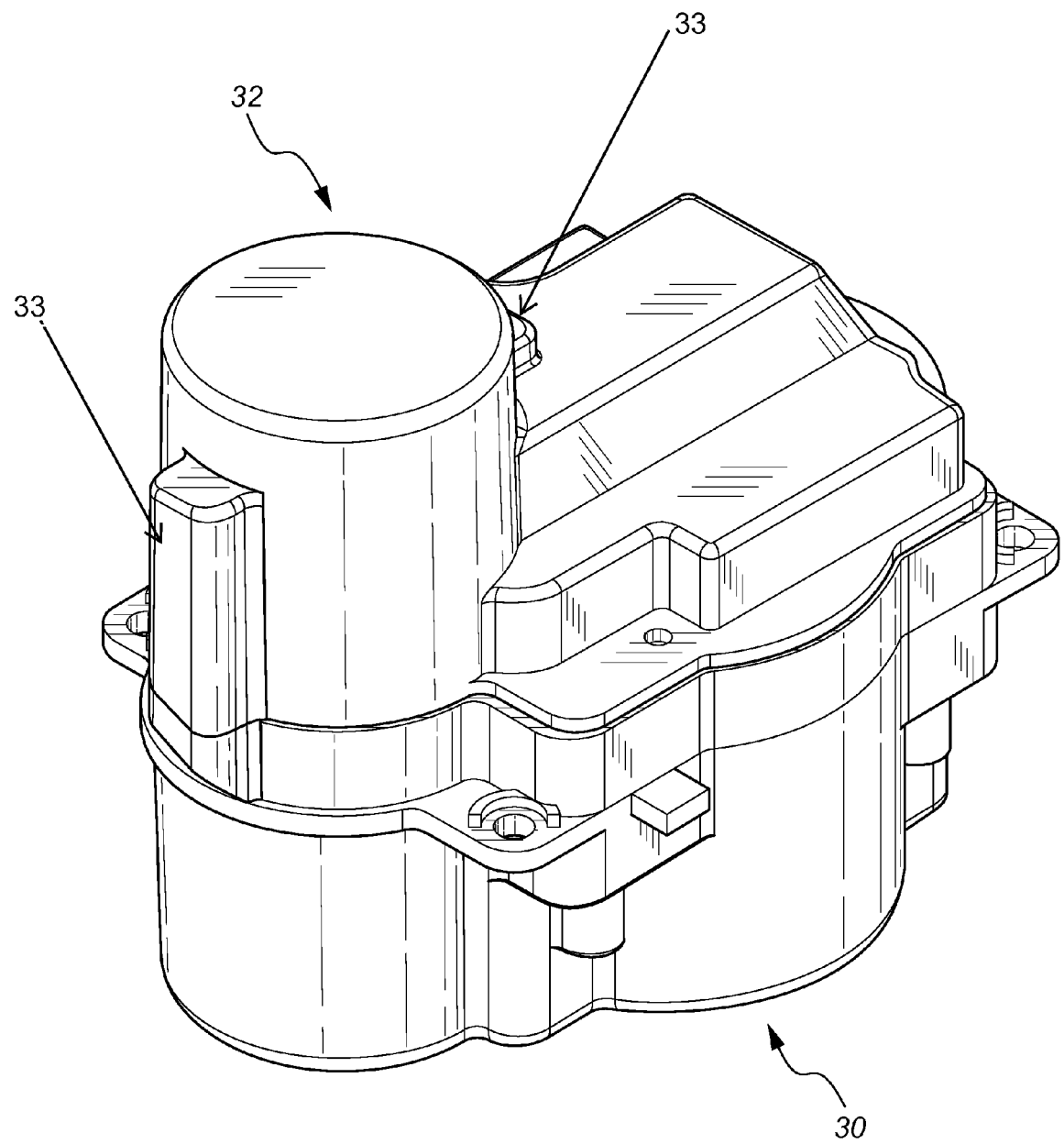
FIG. 5 is a view of the present general inventive concept illustrating the shape and overall of the gear motor housing.

The gear motor housing (30) is shown in FIG. 5. In this figure, the motor dome (32), which covers the motor is shown. The brush holder housing extension (33) is also shown.

Figure 6:
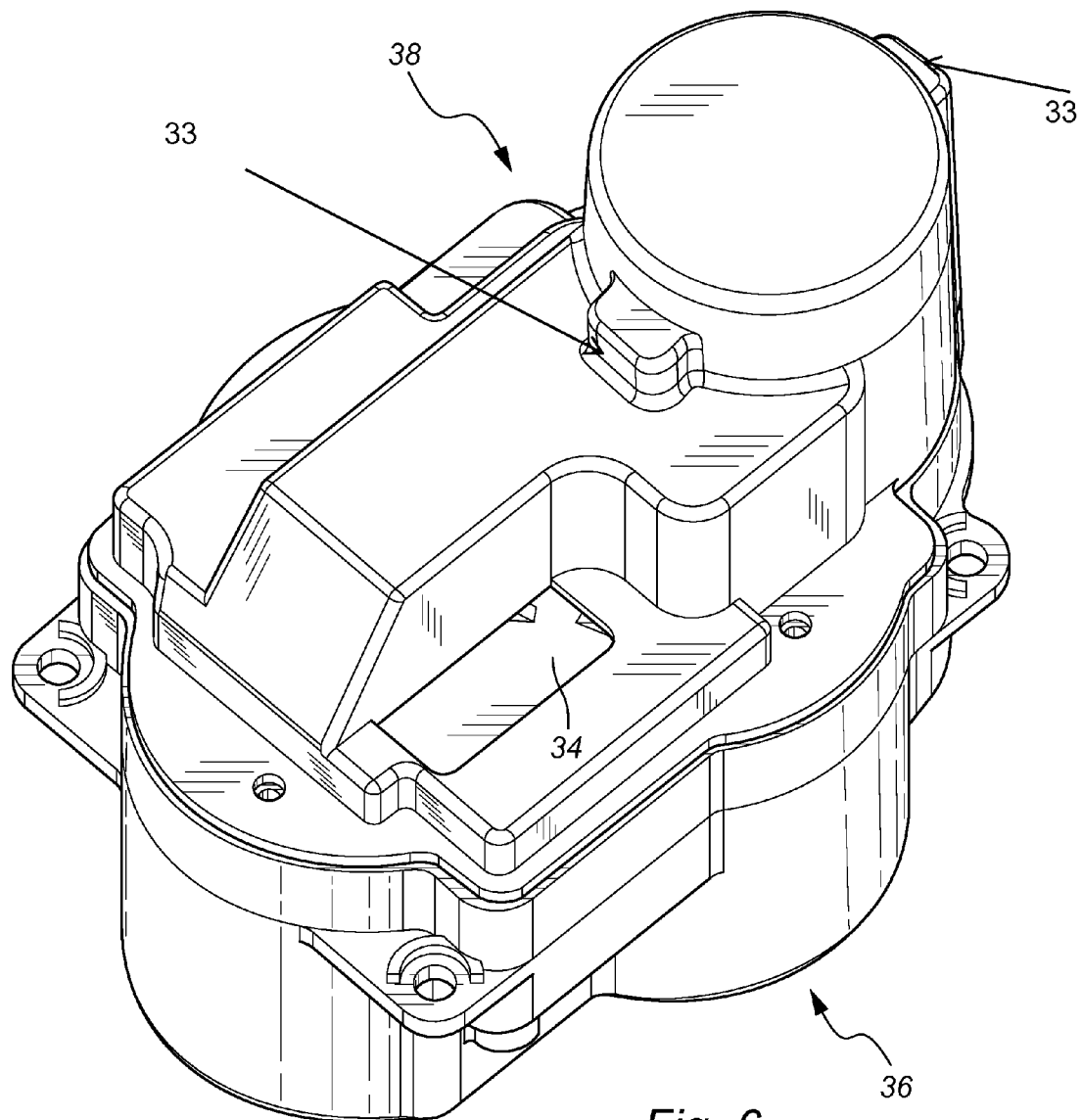
FIG. 6 is another view of the present general inventive concept illustrating the shape and overall outline of the gear motor housing.

In FIG. 6, a header (34) which connects into the refrigerator board is shown. The bottom portion (36) and the top portion (38) of the gear motor housing (30) and the brush holder housing extension (33) are also shown.

Figure 7:
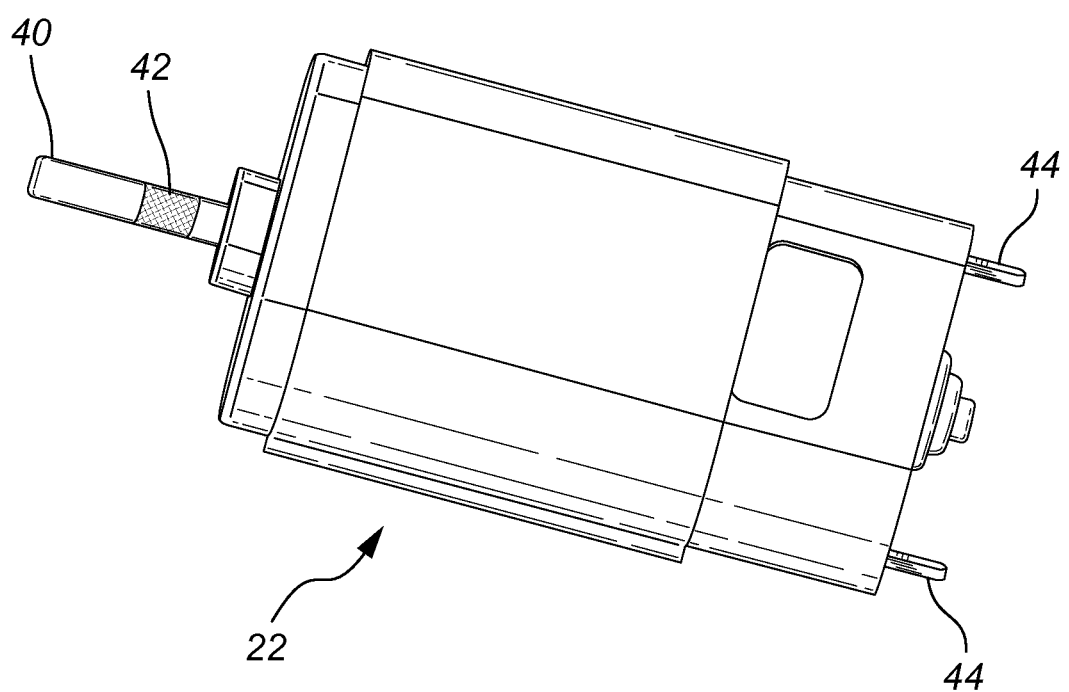
FIG. 7 is a view of the present general inventive concept illustrating views of the PMDC motor and the output shaft double holding force.

The splines (40) and the full knurl (42) are shown on the motor (22) in FIG. 7. Two motor terminals (44) are located on the opposite end of the splines (40) and the full knurl (42). The Permanent Magnet DC (PMDC) motor, the motor's out put shaft indicates two types of "knurling." On the front there are 4 lines spline and on the back by the motor's front bearing there is a full knurl. The motor pinion gear is made out of Zytel and the mating gear is made out of Delrin. The combination of the 2 de-simular materials reduces the coefficient of friction. When the Zytel pinion is pressed onto the shaft, the back end of the pinion is held on the full knurl and the front is held on the 4 lines spline. As a result, the full knurl is holding the pinion strongly onto the shaft because of the high speed as well as the reverse rotation (back end) and the 4 lines spline is supporting the pinion on the front and without expending the pinion's teeth.

Figure 8:
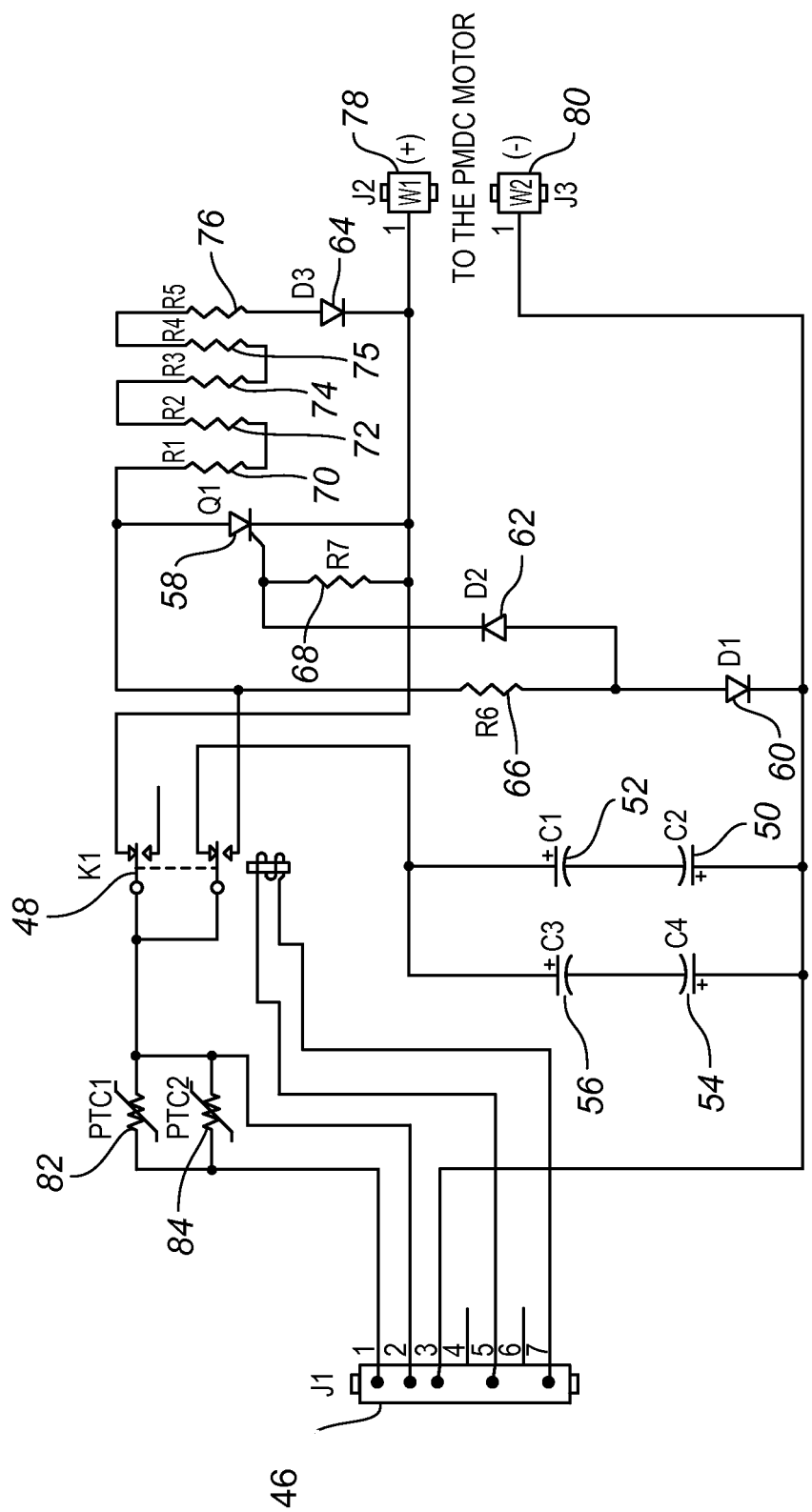
FIG. 8 is an electrical circuit schematic of the present general inventive concept illustrating the basic theory of the control board.

In FIG. 8, an embodiment of the circuit diagram of the control board is shown. The circuit is configured for connecting to a PMDC motor, for example one that is known as for basic refrigerator or freezer electrical wiring. In this figure, Pin #1/J1 (40) is a header on the gear motor that plugs into the refrigerator's board or the main control board. K1 (48) is the Double Pole Double Throw (DPDT) relay that switches both sides of the circuit, and switches from one set of wires to another set in order to control three functions such as cubed, crushed and shaved ice functions. C1, C2, C3, C4 (50, 52, 54 and 56) are the electrolytic capacitors connected in a series parallel mode in order to accommodate the reverse polarity from the main board or the refrigerator board. Q1 (58) is a Silicon Controlled Rectifier (SCR) circuit that drives the motor during the cubed ice mode function. D1, D2 and D3 (60, 62 and 64) are polarizing diodes that are a part of the SCR circuit. R6 and R7 (66 and 68) are biasing resistors in the SCR. R1, R2, R3, R4 and R5 (70, 72, 74, 75 and 76) are power resistors that drop the voltage prior to the SCR's engagement in the operation. J2 (W1) (78) and J3 (W2) (80) are the motor terminals that drive the motor. Positive Temperature Coefficient 1 (PTC1) (82) and Positive Temperature Coefficient 2 (PTC2) (84) function like a circuit breaker and protect the motor from over loads.

Figure 9:
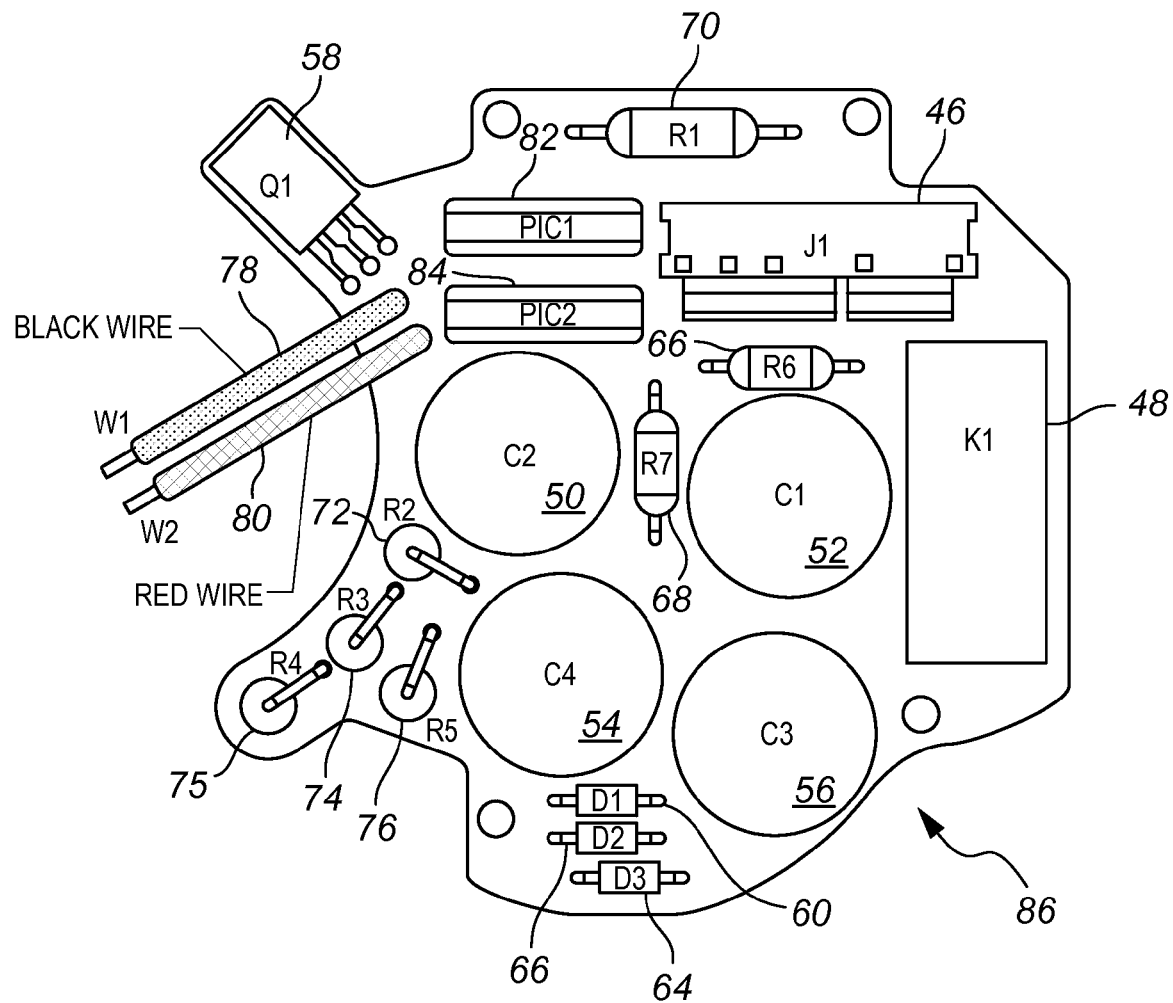
FIG. 9 is a view of the present general inventive concept illustrating the control circuit components on the PCB.
Figure 10:
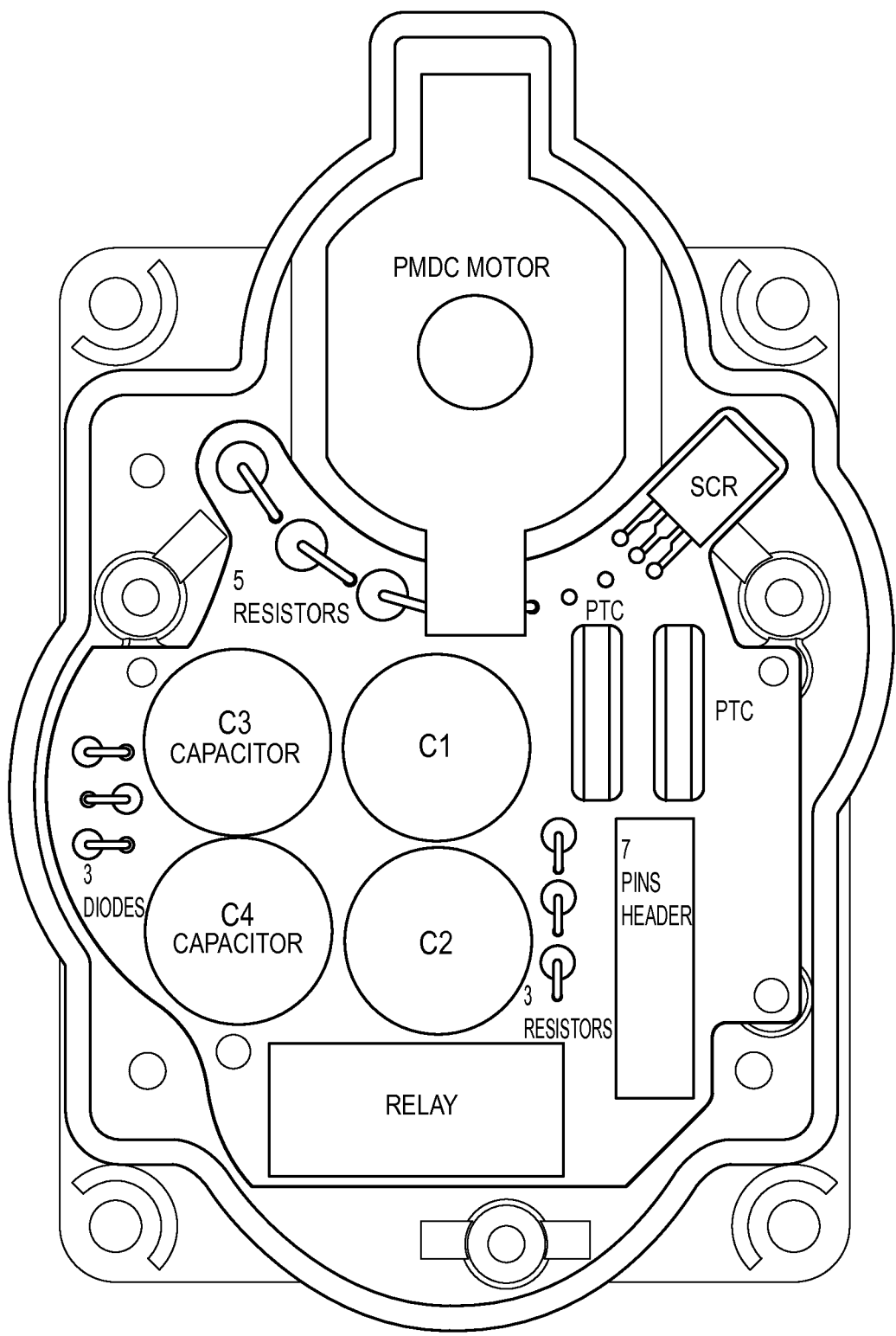
FIG. 10 is a top view of the present general inventive concept illustrating the PCB inside of the gear box.

FIG. 9 shows the circuit components discussed above positioned on a PCB (86). The top view of the PCB (86) inside of the gear box (2).

The basic description of the circuitry follow. A DC voltage is applied to pins #1 and #3 through the header (46) (J1). When Pin #1 (J1) (46) is positive the motor (output shaft) is rotating clockwise (CW), the bank of electrolytic capacitors are across the motor terminal thus filtering the rectified AC voltage as well as maintaining a constant voltage at the motor. This also increases the DC voltage thus increase the motor's speed (RMP) and torque. When pin #1 becomes negative then the motor operates in a counter clockwise (CCW) rotation. The capacitor bank is still in the circuit, during these rotations CW and CCW the motor is performing the Crushed and Shaved Ice Functions.

When an AC voltage is applied at pins #5 and #7 the relay K1 (48) becomes energized and thus switches from the normally closed (NC) to the normally open (NO) position. At this point, the capacitor bank is disconnected and the power to the motor terminal J2 (78) is positive. Now the SCR circuit is in operation for the Cubed Ice function. The resistors from R1-R5 provide the initial voltage drop to lower the motor's speed and when a higher torque is needed, for example if the Ice Cubes stick together then the SCR provides the "feedback" function which maintains the motor's torque at a constant level.

PTC1 (82) and PTC2 (84) are connected in parallel to each other in the circuit and protect the motor from over loads or any other circuit problem during the 3 functions. In the present general inventive concept, the PTC can be placed on the AC side before the full wave bridge or on the DC side after the full wave bridge.

When Pin #1 (46) becomes positive, the motor terminal J2 (78) becomes positive and the motor rotates CW. When the polarity switches from the refrigerator's main control board, then Pin #1 (46) becomes negative, the motor terminal J2 (78) becomes negative and the motor rotates CCW.

The PTC as indicated on both layouts will protect the PMDC motor on all 3 functions, i.e., shaved, crushed, and/or cubed ice.

The value of the resistor can be changed to adjust the voltage across the motor for the cubed ice function. The resistance and the holding current of the PTC can be adjusted in order to satisfy the appliance industries requirement to empty the ice bucket in 4 minutes.

Although the foregoing detailed description of the present invention has been described by reference to an exemplary embodiment, and the best mode contemplated for carrying out the present invention has been shown and described, it will be understood that certain changes, modification or variations may be made in embodying the above invention, and in the construction thereof, other than those specifically set forth herein, may be achieved by those skilled in the art without departing from the spirit and scope of the invention, and that such changes, modification or variations are to be considered as being within the overall scope of the present invention. Therefore, it is contemplated to cover the present invention and any and all changes, modifications, variations, or equivalents that fall with in the true spirit and scope of the underlying principles disclosed and claimed herein. Consequently, the scope of the present invention is intended to be limited only by the attached claims, all matter contained in the above description and shown in the accompanying drawings shall be interpreted as illustrative and not in a limiting sense.

The invention claimed is:

1. A control circuit for a Permanent Magnet DC (PMDC) motor used in an ice delivery apparatus, the circuit comprising:
   a double pole double throw (DPDT) relay having a pair of inputs, a first normally open (NO) contact, a second NO contact, a first normally closed (NC) contact, and a second NC contact, the first NC contact being electrically connected to a first input of the PMDC motor;
   a rectified AC power source having a first connection and a second connection, the first connection being connected to the pair of inputs of the DPDT relay;
   at least one capacitor that is electrically connected on a first side to the second NC contact and on a second side is electrically connected to the second connection of the rectified AC power source and a second input of the PMDC motor;
   a silicon controlled rectifier (SCR) having an anode electrically connected to the second NO contact, a gate electrically connected to the second NO contact through a resistor, and a cathode electrically connected to the first input of the PMDC motor;
   a resistor having one side electrically connected to the second NO contact and another side connected to the first input of the PMDC motor; and
   the double pole double throw relay being configured to operate the PMDC motor with the rectified AC power through the first NC contact for reversible rotation of an output shaft of the PMDC motor during crushed and shaved ice operation of the ice delivery apparatus and to operate the PMDC motor through the second NO contact, the SCR, and the resistor electrically connected to the second NO contact for non-reversing rotation of the output shaft during cubed ice operation of the ice delivery apparatus.

2. An ice delivery system comprising:
   a gear box;
   a Permanent Magnet DC (PMDC) gear motor assembly mounted within the gear box, the PMDC gear motor assembly including a PMDC motor having an output shaft configured for reversible rotation;
   a circuit for rectifying the AC power line to supply the PMDC gear motor;
   a control circuit for operating the PMDC motor comprising:
   a double pole double throw (DPDT) relay having a pair of inputs, a first normally open (NO) contact, a second NO contact, a first normally closed (NC) contact, and a second NC contact, the first NC contact being electrically connected to a first input of the PMDC motor;
   a rectified AC power source having a first connection and a second connection, the first connection being connected to the pair of inputs of the DPDT relay;
   at least one capacitor that is electrically connected on a first side to the second NC contact and on a second side is electrically connected to the second connection of the rectified AC power source and a second input of the PMDC motor;
   a silicon controlled rectifier (SCR) having an anode electrically connected to the second NO contact, a gate electrically connected to the second NO contact through a resistor, and a cathode electrically connected to the first input of the PMDC motor;
   a resistor having one side electrically connected to the second NO contact and another side connected to the first input of the PMDC motor, the DPDT relay being configured to operate the PMDC motor with the rectified AC power through the first NC contact for reversible rotation of an output shaft of the PMDC motor during crushed and shaved ice operation of the ice delivery apparatus and to operate the PMDC motor through the second NO contact, the SCR, and the resistor electrically connected to the second NO contact for non-reversing rotation of the output shaft during cubed ice operation of the ice delivery apparatus; and
   an implement attached to the output shaft of the PDMC motor to dispense ice.

3. The PMDC gear motor assembly according to claim 2 further comprising:
   a motor shaft attached to the PMDC gear motor; and
   a full knurl on a back side of the motor shaft, the full knurl being configured to support a back end of a pinion.

4. The control circuit of claim 1 wherein the at least one capacitor is an electrolytic capacitor.

5. The control circuit of claim 2, the at least one capacitor further comprising:
   a plurality of electrolytic capacitors electrically connected in a series parallel arrangement to accommodate a polarity switching of the rectified AC power.

* * * * *